United States Patent [19]

Hird

[11] Patent Number: 4,945,650
[45] Date of Patent: * Aug. 7, 1990

[54] MEASUREMENT DIGITIZER

[76] Inventor: Edwin A. Hird, 10200 DeSoto Ave., #331, Chatsworth, Calif. 91311

[*] Notice: The portion of the term of this patent subsequent to Nov. 10, 2004 has been disclaimed.

[21] Appl. No.: 288,265

[22] Filed: Dec. 22, 1988

Related U.S. Application Data

[63] Continuation of Ser. No. 392,342, Jun. 25, 1982, which is a continuation-in-part of Ser. No. 783,608, Apr. 1, 1977, Pat. No. 4,419,672, Ser. No. 189,754, Sep. 23, 1980, Pat. No. 4,506,336, and Ser. No. 702,745, Jul. 6, 1976, Pat. No. 4,535,415.

[51] Int. Cl.$^5$ .............................................. G01B 3/12
[52] U.S. Cl. ..................................... 33/763; 33/1 MP; 33/1 PT
[58] Field of Search .............................. 33/138–140, 33/129, 132, 133, 134, 141, 141.5, 142, 1 MP, 1 PT, 1 M, 1 CC, 700, 734, 735, 755, 762, 763; 364/518, 520, 561, 562; 74/89.11, 89.17, 89.18, 89.19, 108, 109, 422; 474/202, 204, 205; 242/54 A

[56] References Cited

U.S. PATENT DOCUMENTS

| 1,237,808 | 8/1917 | Ottinger | 33/137 R |
| 2,824,374 | 2/1958 | Abrams et al. | 33/140 |
| 3,561,125 | 2/1971 | Zeider | 33/1 M X |
| 4,186,490 | 2/1980 | Quenot | 33/139 |

FOREIGN PATENT DOCUMENTS

| 366038 | 12/1922 | Fed. Rep. of Germany | 33/140 |
| 1187311 | 4/1970 | United Kingdom | 33/138 |

Primary Examiner—Harry N. Haroian

[57] ABSTRACT

A new drive system bidirectionally "interconverts" (directs and receives in equal amounts) linear and rotary motions permitting precision linear measuring over long distances. The "convex" surface of coilable rack 30 interlocks with rotatable coupling 262 attached to encoder 32 digitizing electrical signals computer converted to precision linear measurements. Coupling rotations cause perforations in the rack to tightly engage sprockets 304. Many such engagements assure positive motion interconversions thus repeatability of precision linear measurements synchronized with the international standard of length. A second encoder 82 may be used to digitize lateral rotations of the above permitting precision polar or Cartesian coordinate measurements produced over large surfaces.

36 Claims, 4 Drawing Sheets

FORMULA:
$X = r \cdot \cos \theta$
$Y = r \cdot \sin \theta$

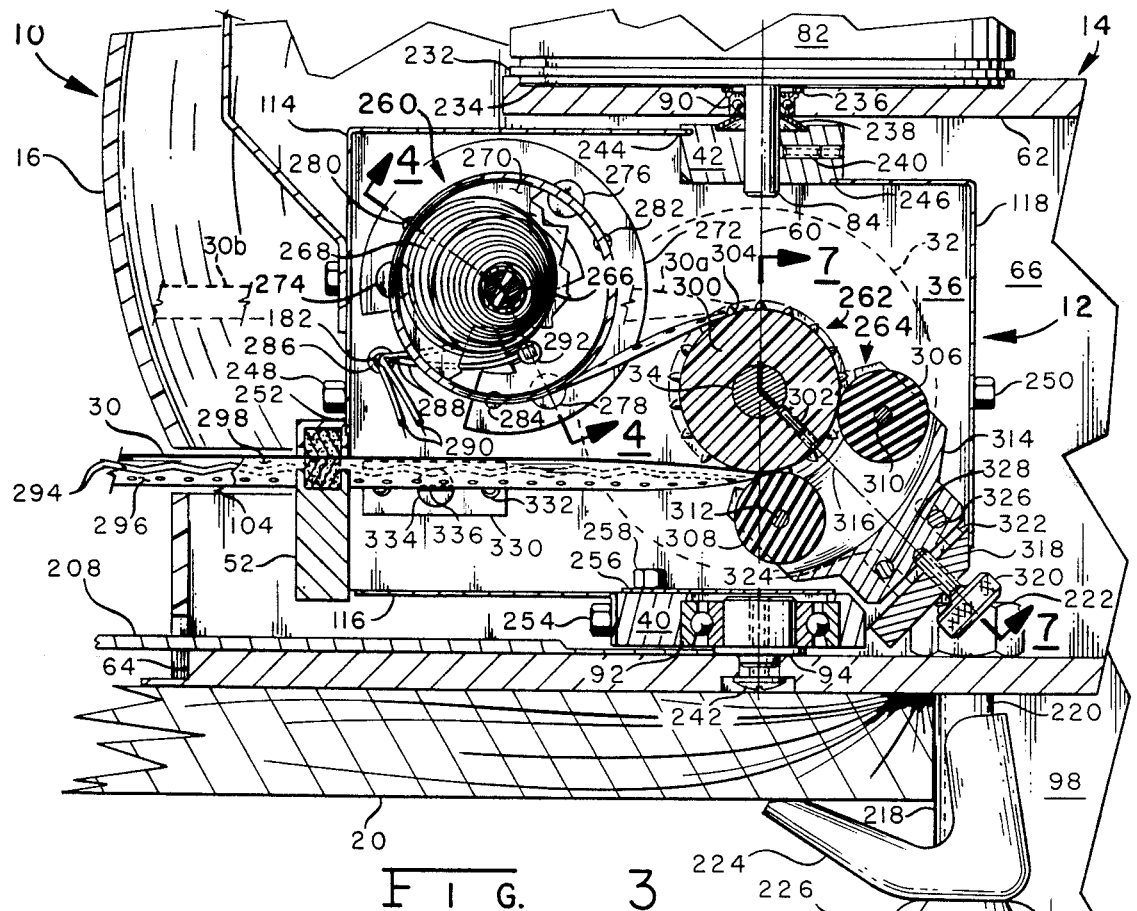
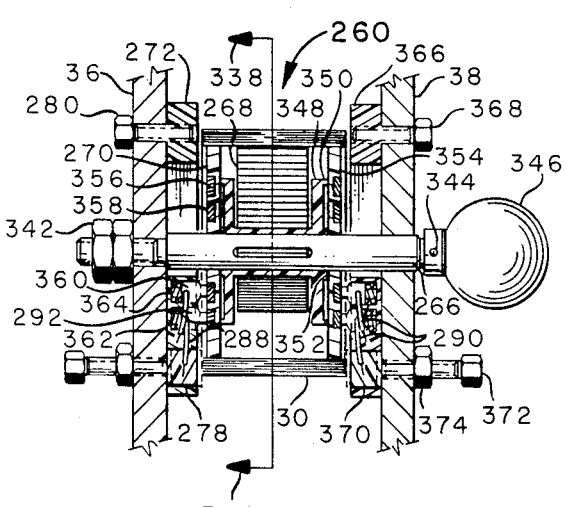
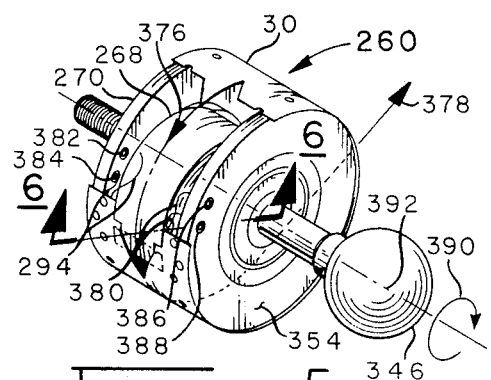
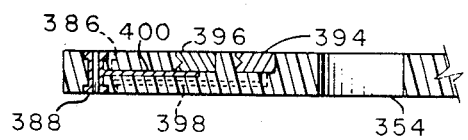
FIG. 3
FIG. 4
FIG. 5
FIG. 6

MEASUREMENT DIGITIZER

This is a continuation of application Ser. No. 392,342, filed June 25, 1982, for a Measurement Digitizer, which in turn is a continuation-in-part of three prior U.S. patent applications: (1) application Ser. No. 783,608, filed Apr. 1, 1977, now U.S. Pat. No. 4,419,672, for a Point Locator And Graphics Digitizer System; (2) application Ser. No. 189,754, filed Sept. 23, 1980, now U.S. Pat. No. 4,506,336, for a Point Location And Graphics Display Apparatus., and (3) application Ser. No. 702,745, filed July 6, 1976, now U.S. Pat. No. 4,535,415, for a Measurement Conversion And Visual Display Instrument.

The three referenced U.S. Patents and the Measurement Digitizer application each involve the production of linear measurements from conversions of linear and rotary motions, and all involve a thin, cross-sectionally curved drive member. The method of conversion is of prime consideration for reliability and repeatability of measurements produced.

U.S. Pat. No. 4,535,415 teaches a friction drive system of conversion. U.S. Pat. No. 4,419,672 teaches a similar system, and includes rotation means for determining polar coordinates. U.S. Pat. No. 4,506,336 teaches a positive drive system of conversion utilizing sprocket inclinations and alignment lands, and also incorporates polar measuring capabilities. Of major significance with the Measurement Digitizer is the improved and controlled system for digitizing linear and, therefore, polar measurements. Its inventive concepts have necessitated an invention of a new and positive drive system for the "interconversions" of linear and rotary motions.

BACKGROUND

To "interconvert" motions is clarified as follows: Inter is an indicator meaning "mutually" which means "directed and received in equal amounts," and convert means to "change." Thus, to interconvert motions is to "mutually change motions," "equally change motions," "direct and receive motions in equal amounts," or "equally displace motions."

Motions of previously known drive systems cannot interconvert due to combinations of normal, environmental discrepancies such as backlash, slipping, stretching, unavoidable tolerance deviations, tangency misalignments, etc. With such discrepancies motions obviously convert (change) but they cannot interconvert (mutually change).

Consequently, if drive systems have been used as measuring systems for producing linear measurements, because measurements made by a drive's linear element are calculated from rotations made by its rotary element, discrepancies inbetween cause the measuring system's calculated measurements to be incorrect. This age-old problem is corrected with this invention by interconverting linear and rotary motions and therefore producing precision linear measurements over long distances.

At the National Bureau of Standards, the Dimensional Metrology Laboratory there utilizes an interferometer. With it, under environmentally controlled conditions measurements to approximately 200 inches long may be produced using light waves. The wavelengths of distances are counted with computer assisted techniques producing finite measurements which may be certified. Components may be measured there and certified, if required, to be accurate within several millionths of an inch. By contrast, within industry it is well known that the capability to produce measurements within a tolerance range of about 0.001 inch at extended lengths beyond relatively few inches is virtually unknown.

Devices such as large calipers or bow micrometers have "resolution" factors that are "graduated" to read 0.001 inch or less when extended to the lengths described. No assurances however are implied that the dimensions will actually be as read. For example, any two scales having similar divisions may be meshed and visibly witnessed that every indicant does not align. All scales are like this. When such indicia are then aligned with others, and used to facilitate vernier measurements, there exists no common denominator to determine the accuracy of the measurements. If using a bow micrometer, other length standards must be used in conJunction presenting other difficulties that again often negate desired measurement precision.

The above conditions have always plagued machinists, few of who will trust finite measurements as explained made with the devices described. Other means are employed to match-fit components, and many machinists will not accept such Jobs. Because of these conditions it is well known among design engineers that machining operations requiring finite measurements will entail additional expense. Therefore, wide latitude is afforded such problematic designs. Despite preferences to obtain accuracy it has become custom to design around such problems. In many instances consequences are parts which do not fit; requirements for hand operations, with increased costs being inherent rather than being able to depend upon less costly production techniques; and weakened structures due to the build up of tolerances made necessary and purposefully incorporated with design reconciliations.

As well as producing finite measurements at extended distances, computer aided design and drafting (CADD) are technologies with which the measurement digitizer of this invention may also be used. With these sciences the measurement problems indicated have thus far been avoided using other techniques. A popular technique uses a surface beneath which a printed circuit is embedded, and that has vertical and horizontal wires spaced about 0.010 inch apart. Through electrical induction with a pen-like instrument slid along the surface, analogous cross hair lines are displayed by a CRT. Other data entry mechanisms are the typewriter-like keyboard, light pen, cursor arm, tract ball, Joystick, thumbwheel and more. The measurement digitizer differs from these devices in that it may also be used directly with machine tools and for fabricating precision measurements.

BRIEF DESCRIPTION

Heretofore, for producing precision linear measurements little significance has been attached to drive systems that simply convert linear and rotary motions. MaJor reasons as explained are motion discrepancies that have always caused measurements to be incorrect and measurement repeatability to be impossible. Consequently, there has always existed a need for a drive system that will interconvert motions. It is recognized that the total absence of hysteresis is analogous to either a perfect straight line or circle and thereby only possible with theory. Urgently needed however is a drive system for interconverting linear and rotary motions whereby motion discrepancies for practicable purposes do not exist or are negligible in terms of reality. This invention discloses such a drive system.

As explained, when "interconverting" linear and rotary motions to produce linear measurements, linear measurements are calculated from the displaced rotary motions. If linear and rotary motions are not "interconverted," "mutually changed," "directed and received in equal amounts," or "equally displaced," then of course linear measurements being equal segments can't logically be calculated from unequally displaced rotary motions. This invention teaches "interconverting" linear and rotary motions whereby displaced linear motions are linear measurements that may be calculated simultaneously from equally displaced rotary motions.

Therefore, an obJect of this invention is a product for interconverting motions of linear and rotary elements, eliminating for practical purposes unrepeatability of motions interconverted, and thereby making possible the same finite measurements to be established when interconverting motions of the elements from opposite directions.

A further obJect of this invention is a process specially adapted for the manufacture of said product for interconverting linear and rotary motions.

Another obJect of this invention is use of the above mentioned product with a measurement digitizing device accurately interconverting motions of linear and rotary elements, and generating electrical signals of digital measurement representations thereof.

An additional object of this invention is to provide an improved means, with a movable cursor, of determining electrical signals defining positions of the cursor upon a surface representative of X and Y coordinates, and establishing specific coordinates using the product for interconverting linear and rotary motions, and eliminating, for practical purposes, hysteresis or backlash thus unrepeatability of the measurements so produced defining said coordinate positions.

Yet a further object of this invention is the production of measurements, using said product for interconverting linear and rotary motions of elements; the measurements being traceable to the U.S. Bureau of Standards' Dimensional Metrology Laboratory, and thus being representative of established, international measurement criterion.

The measurement digitizer is a device normally used for indicating linear distances and polar coordinates. The digitizer described and illustrated is usually placed centrally upon a working or drafting table, and it is capable of being connected with a variety of electronic equipment such as computers, counters, converters, indicators and more. A cursor, connected to the digitizer with a new component called a perforated rack, may be extended to any point upon the surface and the digitizer will generate electrical signals proportional to the cursor point's position. The signals are relative with the radius vertex and polar angle of the cursor point's polar coordinates.

A linear measuring apparatus, necessary for polar coordinates, may be used independently to determine finite increments of linear measurements. These are made possible by a new and unique system for the interconversions of linear and rotary motions. This new system involves the perforated rack and a sprocket wheel coupling. The rack, normally curved in cross section, is radially bent against its convex side and about the coupling aligned with sprockets. As the coupling is rotated, perforations in and adJacent the sides of the rack fall and rise with the rack being deformed and flattened where radially bent and rotated with the coupling. The rack perforations are ring-fitted with the sprockets whereby no apparent backlash or hysteresis can take place. The coupling is coaxially mounted with a shaft position encoder, therefore, the slightest linear micromovement of the rack is relative with the electrical signals generated by the encoder.

The new system for interconversions of linear and rotary motions is significant in that measurements having finite resolutions may be indicated over relatively long distances of many feet or yards. With the positive drive-perforations ring fitted and incapable of slipping, repeatability is inherent.

The rack, straight when extended and retracted, is made capable of lateral rotation about a vertical axis. This axis is centrally located within the digitizer where a second shaft position encoder is attached capable of generating electrical signals relative to lateral rotations of the rack. Therewith, linear motions of the rack are relative to radius vertexes and rotational motions are relative to polar angles, the two kinds of measurements comprising the polar digitizing system.

BRIEF DESCRIPTION OF THE DRAWING VIEWS

FIG. 3 is a section view taken from FIG. 1, and depicts the linear and angular apparatus' internal operating characteristics.

FIG. 4 is a section view taken from FIG. 3, and shows a rack holder of the linear measuring apparatus.

FIG. 5 is an isometric view of the rack holder, and depicts its connections with a perforated rack.

FIG. 6 is a section view taken from FIG. 5, and shows a method of electrical conductivity through the rack holder.

DETAILED DESCRIPTION AND SPECIFICATION

Polar coordinates of a point on a plane may be visualized as a twofold fix of "linear" (radius vertex) and "angular" (polar angle) measurements. The radius vertex is a linear measurement along a pivotal axis from its vertex to the point. The polar angle is an angular measurement between the pivotal axis and another fixed axis with the same vertex as the pivotal axis. Together, they form the polar coordinates (twofold fix of the point) in relation to their common vertex. Thus, a measurement system capable of digitizing polar coordinates must incorporate within it the functions to digitize both kinds of measurements., linear and angular.

Figure 1:
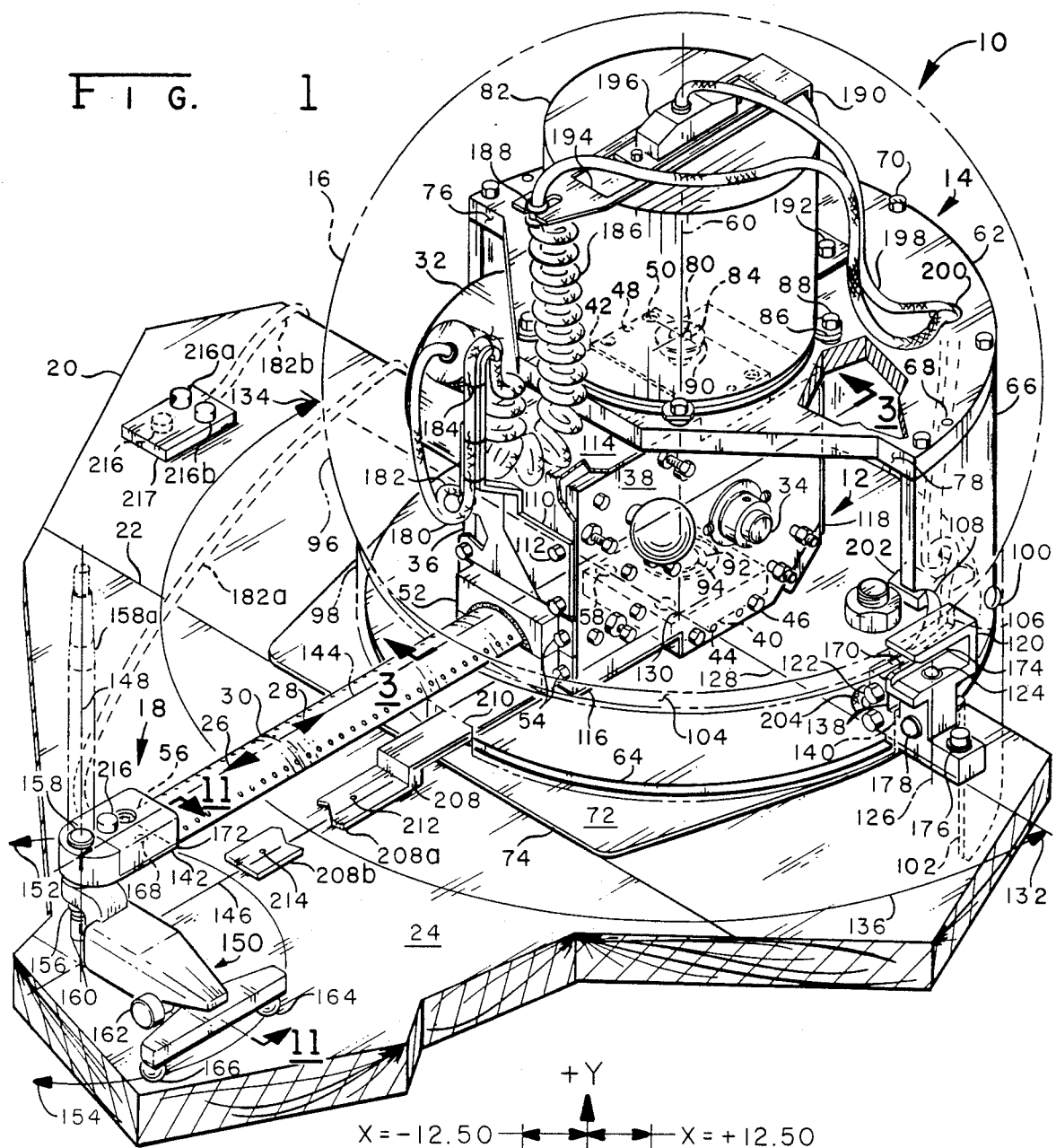
FIG. 1 is an isometric view depicting the measurement digitizer in an operable position and showing its linear and angular measurement functions.

The measurement digitizer of this invention, including both linear and angular measurement functions, is generally illustrated in FIG. 1. Therein, the digitizer identified by the numeral 10 is shown incorporating linear measuring apparatus 12, angular measuring apparatus 14, a cover 16 (shown with reference lines for clarification of that which it contains), and a cursor assembly 18.

Although digitizer 10 may be arranged to operate from any direction, the arrangement shown and described with FIG. 1 best illustrates its features used with conventional technologies. For clarification, "forward" is in the direction of cursor assembly 18 looking from angular apparatus 14.

Digitizer 10 is attached to the upper rear edge of a table 20 (shown sectionalized) and centrally located from the table's sides (not shown). Table 20 is representative of any drawing, drafting, or working table. Affixed to the table with tape or the like (not shown) is a document 22 representing any drawing, drawing reproduction, paper, map, or record of any size governed by the surface size of the table. The surface 24 of document 22 represents a two-dimensional plane on which points may be or are recorded. The polar coordinates of such points may be digitized by this invention.

The measurement process of linear apparatus 12 involves the bidirectional interconversions of linear and rotary motions. It will be shown and described how these interconversions are accomplished whereby hysteresis and backlash, for practical purposes, are nonexistent. Forward and reverse linear motions, shown by arrows 26 and 28, of a perforated rack 30 are measured by the bidirectional rotational movements within encoder 32 that are made by its shaft 34. Thus, rack 30 may somewhat be compared with a rack of a conventional rack and pinion arrangement in that the two are used for displacing linear and rotary motions. However, with a conventional rack and pinion backlash is inherent while with rack 30 and the sprocket wheel coupling (to be described) backlash is eliminated.

When extended or retracted rack 30 is rigidly straight and perpendicular to shaft 34, and often embodies two parallel rows of holes equally spaced along its length. It is thin, normally curved in cross section, coilable, and usually made of metal tape. It may however be made of plastic. The fact is stressed that although rack 30 is little thicker than an average diameter of a human hair it possesses considerable strength and rigidity being cross-sectionally curved.

Linear apparatus 12 embodies vertical walls 36 and 38 held parallel with bottom plate 40 and top plate 42 attached with taper pins 44 and 48 and screws 46 and 50. Although encoder 32 may be mounted upon either wall because it is bidirectional, it is shown mounted to the outside surface of wall 36 with the end of its shaft 34 secured by hardware in wall 38. Rack 30 emerging from cleaner assembly 52 (attached with screws 54) has its distal end 56 sandwiched in cursor assembly 18. Cleaner assembly 52 consists of top and bottom grooved segments containing wiper strips between which rack 30 slides thus protecting linear apparatus 12 from debris.

Linear apparatus 12 may be used separately. When so used its housing may be mounted for lateral rotatability, or mounted upon a planar surface by using mounting holes 58 in bottom plate 40. If mounted flat, it is suggested that provisions be considered to extend and retract rack 30 in a perfectly straight line because the rack will not bend or curve sideways. If mounted for rotatability, the shaft of the vertically mounted encoder (to be described) may appropriately be replaced with a short shaft.

Now focusing upon angular apparatus 14. This apparatus measures with electrical pulses the angle made by linear apparatus 12 when laterally rotated about vertical axis 60. Any angle so measured is known as a polar angle. Then, any linear measurement made by linear apparatus 12 is known as a radius vertex. Together, the polar angles and radius vertexes form the polar coordinates that are the locations (addresses) of points on surface 24.

Angular apparatus 14 is shown configured with a top plate 62 and bottom plate 64 held parallel with semicircular wall 66. Taper pins 68 are used to reposition top plate 62 when installing linear apparatus 12; screws 70 then securing the top plate. Base plate 64 has a bottom lip 72 having a front edge 74 parallel with the edge of table 20, and that also serves as an alignment edge against which document 22 may be abutted.

Top plate 62 is spotfaced to accept the circumferential mounting flange of a second encoder. The frontal sides of the plate are tapered rearward and outward to two abutment edges 76 and 78 whose surfaces are in a line slightly beyond the vertex 80 of top plate 62.

A bidirectional encoder 82 having a rotatable shaft 84 is mounted coaxial with vertical axis 60 with a plurality of mounting cleats 86 secured with screws 88. The shaft penetrates a ball bearing 90 mounted within top plate 62 and terminates within top plate 42 of linear apparatus 12 where it is retained (not shown in FIG. 1). In line with the lower extremity of vertical axis 60, a thrust ball bearing 92 of the angular contact type is secured within the bottom plate 40. A tridiameter shaft 94, its top end shown penetrating ball bearing 92, has its opposite end (not shown in FIG. 1) penetrated and retained within base plate 64. In this manner linear apparatus 12 is free to rotate laterally about axis 60 and between ball bearing 90 and thrust ball bearing 92.

Cover 16 is designed to allow rack 30 to rotate from side to side. Although it may be of any appropriate shape, a spherical shape was selected because of the inherent strength of a sphere. The cover is designed with a dome 96 joined to a circular base 98. Underneath where it is Joined the base is attached to wall 66 with a plurality of thread forming screws 100 (only one shown). A rear, semicircular protrusion of circular base 98 extends below the surface of table 20 whereby the two forward edges of the base, such as edge 102, are abutted forward against the edge of table 20. It is in this manner that digitizer 10 is aligned into its operable position with the table.

Extending from side to side and around the front of cover 16 is a slot 104. The height of the slot is sufficient to allow clearance above and below rack 30 as it rotates. The sides of the slot extend beyond the centerline of circular base 98 so that its edges, as edge 106 (one edge only shown), give sufficient clearance to the edges of rack 30 when rotated. Also, shown behind edge 106, semicircular cuts as cut 108 are machined out of each end of circular wall 66. These cuts allow rack 30 its full rotational swing.

A stop bracket 110, preventing rack 30 from striking the edges of the slot or semicircular cuts described above, is mounted with screws 112 against the front of linear apparatus 12. The screws penetrate through a dust cover 114 and into the front of wall 38. (Dust cover 114 and two other covers 116 and 118 protect the inner workings of linear apparatus 12.) Stop bracket 110 has an upper extremity jutted forward whereby when an abutment edge 76 or 78 is struck by it sufficient clearance for rack 30 is then afforded to edges 106 or cuts 108.

A cursor holder 120 is attached with screws 122 to the near edge of wall 66. A ball plunger 124 is threaded upward from the base of the holder and penetrates into a bifurcation designed to receive and lock cursor assembly 18 into a preset position. It is from this position that the electronics of digitizer 10 are set. Ball plunger 124 is a commercially available assembly consisting of a steel ball partly penetrating an aperture, and backed by a disk which in turn is backed by a compression spring.

The vertical centerline 126 of the ball plunger bisects a horizontal fixed axis 128 having a vertex 130 on vertical axis 60. It is from axis 128 that the polar angles are determined. An extension of it (shown dashed) represents the extent to which polar angles are made. This extent is 180 degrees and is represented by the polar angle arrows 132 and 134 at the extremities of semicircular, polar angle line 136.

Cursor holder 120 has a U shaped cut 138 permitting slot 140 in the base of cover 16 to fit over the U-shaped cut. In this manner, cursor holder 120 may be attached inside of the cover 16 and the main body of the cursor holder will extend outside.

The inside height of the cursor holder's bifurcation is machined to receive the assembled height of cursor 142 that has top and bottom segments between which rack 30 is sandwiched. When sandwiched, the centerlines of the rack and cursor are aligned indicated by centerline 144 bisecting vertical axis 60. Centerline 144 is also represented on surface 24 by the radius vertex 146 bisecting vertical axis 60 at vertex 130. Thus, the vertex is common to both fixed axis 128 and radius vertex 146.

A vertical axis 148 of cursor assembly 18 is at all times held perpendicular to surface 24 with a hand operated cursor guide 150. The guide may be rotated 360 degrees, indicated by arrows 152 and 154, about an insert 156 through which a scribe 158 is coaxially penetrated. A mechanical pencil 158a, shown referenced, may also be used because the cursor is machined to accept either. Cursor guide 150 is tripodaled by scribe 158 with its tip 160 (or by the mechanical pencil lead or marker) touching surface 24. With the adjustment screw 162, sliding balls 164 and 166 may be adjusted (to be shown and explained) up or down to contact surface 24. With that adjustment axis 148 is made perpendicular to the surface and the cursor guide is allowed to rotate.

The bottom of cursor 142 embodies a hole 168 the centerline (not shown) of which is perpendicular to centerline 144. Hole 168 is designed to mate with the ball in ball plunger 124, and has a diameter slightly less than the diameter of the aperture within ball plunger 124 that retains the ball. In this manner, when the edge of hole 168 depresses the ball, the ball will exhibit a reverse force against it.

A wall 170 is provided on the lower branch of the bifurcation, and the wall, top, bottom, and rear of the bifurcation serve as a nesting area for cursor 142. Also, for easy insertion of the cursor the bifurcation's branches are usually chamfered.

It may now be visualized that while holding the cursor guide 150, as the corner 172 of cursor 142 is gently pushed toward the corner 174 in the cursor holder, the ball in ball plunger 124 will depress allowing the cursor to enter the bifurcation. When the ball begins to penetrate hole 168, and cursor guide 150 is released, cursor 142 will automatically be centered each time by ball plunger 124. This position of scribe tip 160 is synchronized (to be explained) with the electronics of digitizer 10. When inserted as described the fit is designed so tip 160 is slightly lifted from table 20. The sponge-like, upper wiper strip in cleaner assembly 52 allows rack 30 to be lifted to that extent. Therefore, tip 160 is prevented from striking the surface of the table and possibly being misaligned.

Although they may be located anywhere, cursor holder 120 is shown incorporating the digitizer on-off switch and a light lit with the switch in the "on" position. The wiring (not shown) for the switch 176 and light 178 is fed from inside of cover 16 through a hole (not shown) in cursor holder 120. With this arrangement cover 16 may be removed and replaced without disturbing the wiring.

A wire bundle 180 (from encoder 32) has branched from it another wire bundle 182 carrying the electricity conducted to a push button switch located on cursor assembly 18. An alternative method of conducting electricity to the switch is through wire bundle 182a (shown dashed). The switch for signaling the positions indicated by encoders 32 and 82 may also be located separately shown fed by wire bundle 182b (also shown dashed).

Wire bundle 180 is attached with tape or ties 184 to the upper extremity of stop bracket 110 so the wire bundle or ties will not interfere with the stopping action of the bracket. Bundle 180 is hung in a loose coil 186, the top end being captured by a grommet 188 within a bracket 190 supported by encoder 82. Bracket 190 is attached with screws 192 to top plate 62 and employs a cutout 194 to adapt with the particular arrangement of plug 196 attached to encoder 82. In this way, linear apparatus 12 may be rotated from side to side and coil 186 will exert minimum resistance to the movement.

From grommet 188 wire bundle 180 parallels another wire bundle 198 from encoder 82. The two bundles are fed through a hole 200 in top plate 62 and extended to a receptacle 202 attached appropriately to base plate 64. An additional wire bundle 204 containing the wires from switch 176 and light 178 may be seen extending from cursor holder 120 inside of the cover's circular base. This bundle joins bundles 180 and 198 at receptacle 202.

The outputs of encoders 32 and 82 may vary depending upon the application of digitizer 10. The outputs are generally predicated upon the input requirements of electronic equipment to which digitizer 10 is connected, signal manipulability of such equipment, and the end use of signals produced. For example, if digitizer 10 is connected with a mainstage computer having functions to manipulate signals, encoders generating pulses would be appropriate. If connected directly with a polar to rectangular converter, encoders generating binary coded decimal signals may be required. If digitizer 10 is used to locate and store addressable points, such as on a map, encoders having binary coded signals may be used, or encoders generating only pulses may be used if connected with a digital pulse counter.

Although any type of shaft position, signal generating device may be used with digitizer 10, an example is used to show and describe measuring functions. Adequate encoders are for example shaft position encoders of the optical, bidirectional incremental type utilizing gallium arsenide light emitting diodes as an illumination source, and generating square waved electrical pulses. These are operable within a temperature range of 32 degrees to 185 degrees Fahrenheit, and each encoder employs two data outputs; data A and data B. One output, usually data A, is normally energized when emitting pulses for a forward direction as the encoder's shaft is rotated clockwise. The other output, usually data B, is normally energized when emitting pulses for a reversed direction as the encoder's shaft is rotated counterclockwise. Such encoders are available each having specific numbers of pulses per revolution of its shaft. For example, encoders that will generate more than 86,400 pulses per revolution, clockwise or counterclockwise, are not uncommon.

With the new system for interconverting linear and rotary motions (to be fully described and explained), an encoder generating any number of pulses per revolution of its shaft may be used with each signal representing a converted linear distance. Therefore, depending upon the tolerance desired a suitable encoder may be chosen. For example, with the science of computer graphics 0.010 inch is a tolerance often required when digitizing coordinates of a point upon a plane. In order to digitize within the example of 0.010 inch, encoders generating 1,000 and 36,000 pulses per revolution of their shafts may be used.

The above is explained whereby rack 30 can be configured to move linearly approximately 3.60 inches with each rotation of shaft 34. Therefore, with encoder 32 chosen to generate 1,000 pulses per revolution of shaft 34, rack 30 will move approximately 0.0036 inch per pulse generated (3.60 inches divided by 1,000 pulses). The 0.0036 inch is then well within the 0.010 inch tolerance explained.

With the example outlined the number of pulse signals generated by encoder 82 would be chosen by first determining the longest radius vertex to be used by digitizer 10. The longest being equal with the distance from vertical axis 60 to a lower corner of surface 24, not shown in FIG. 1 but approximately 52.38 inches long. The circumference of a circle having that radius is 329.1132 inches (2 times pi times 52.38 inches). That circumference divided by an example of 36,000 pulses then chosen for encoder 82 equates to a movement per pulse generated of 0.0091 inch. With encoders 32 and 82 then, the polar coordinates' maximum tolerance window of 0.0036 inch by 0.0091 inch would fall within the 0.010 inch by 0.010 inch tolerance indicated when digitizing with computer graphics.

Although the encoders used are usually digital, analog type encoders may also be used. For example, encoder 32 could be a 20 turn potentiometer and encoder 82 a single turn potentiometer. However, with digital encoders one rotation may be divided into more than 86,400 increments. With an analog potentiometer type of encoder, 86,400 parts equate to 15 seconds of a degree ((360 times 60 times 60) divided by 15 equals 86,400)) requiring a potentiometer not as available as the digital type normally used.

Since the exact linear movement of rack 30 per rotation of shaft 34 cannot be predetermined because of obvious fabrication tolerances, a measuring beam 208 is utilized to determine that distance. The beam (shown broken to fit within FIG. 1 and given the designations 208a and 208b) has been taught extensively in my U.S. Pat. No. 4,506,336 herein incorporated. With its explanation it will be obvious that for linear measurements only it may be abutted anywhere against linear apparatus 12 and not synchronized to vertex 130 indicated here with polar requirements. For linear measurements, digitizer 10 interfaced with a computer may be digitized with using the well known "floating zero" computer programming technique.

Measuring beam 208 incorporates finite dimensions originated at the Bureau of Standards' Dimensional Metrology Laboratory (DML). The beam penetrates slot 210 in the cover's circular base 98. It is slid along the circular floor and abutted against the tridiameter shaft 94 (to be shown with FIG. 3). From the abutment end along its centerline precise measurements are made by the DML to the centers of scribe holes 212 and 214. From where abutted the radius of tridiameter shaft 94 is added to the measurements obtained for the beam. In this manner the precise radius vertexes to the centerlines of holes 212 and 214 are then known.

With encoder 32 connected with a digital pulse counter, tip 160 of scribe 158 is first inserted into one measuring beam hole and then the other with the pulse count between determined. Then, because the precise distance between the holes is known, the "pulse count" from vertex 130 to the centerline of hole 212 may proportionally be determined because that "measurement" is known. With tip 160 then inserted in hole 212, the pulse counter may be zeroed back to vertex 130 by subtracting the number of pulses counted for that distance. Measuring beam 208 is then withdrawn and set aside.

Cursor 142 is inserted into its "locked" position within cursor holder 120. The pulse count there may then be read from the pulse counter. That count and its proportional distance is then recorded and may be used with any electronic equipment to which digitizer 10 may be attached. It may now be visualized that each time cursor assembly 18 is withdrawn from cursor holder 120, and tip 160 placed anywhere on surface 24, the distance (radius vertex) from vertex 130 may always be determined because it is relative to the additional pulses from centerline 126 emitted by encoder 32.

The above conditions should be accomplished within an environment having humidity and temperature equal with those (stamped on measuring beam 208) when the beam was measured at the DML. Thereafter, the using environment is dependent upon the material of rack 30, the small extent to which measurements are desired, and of course the material to be measured.

Of course, all materials change lengths with changes in temperature. For extremely finite measuring, thermal expansions or cryogenic contractions of the material being measured and also for rack 30 must be taken into consideration when digitizer 10 is used at temperatures other than its measuring synchronization temperature. If that being measured changes length differently than digitizer 10, compensation should be made accordingly.

For encoder 82, synchronization of its electrical pulses with the polar angle is relatively easy. With cursor assembly 18 "locked" within cursor holder 120, tip 160 is resting upon fixed axis 128. With this position the polar angle of encoder 82 is 0/360 degrees. Polar angles with conventional electronic technologies are usually determined counterclockwise from a fixed axis at that position. Then, using a polar to rectangular converter the polar coordinates may be converted to Cartesian coordinates. Thus, with digitizer 10 the polar angles along polar angle line 136, from polar arrow 134 counterclockwise to polar arrow 132, are representative of polar angles from 180 degrees to 360 degrees.

Wires embedded within rack 30 lead to push button switch 216 shown on cursor 142. When cursor assembly 18 is extended or retracted to any position on surface 24, switch 216 may be depressed signaling the shaft position of the encoders relative to the position of tip 160, linearly from vertex 130 and angularly from fixed axis 128. Together, the two dimensions are the polar coordinates. When not advisable to contain the switch in cursor 142, switch 216 (shown dashed in a moved position) may be contained in switch holder 217. Switches 216a and 216b are alternative switches to signal the positions of the encoders.

Figure 2:
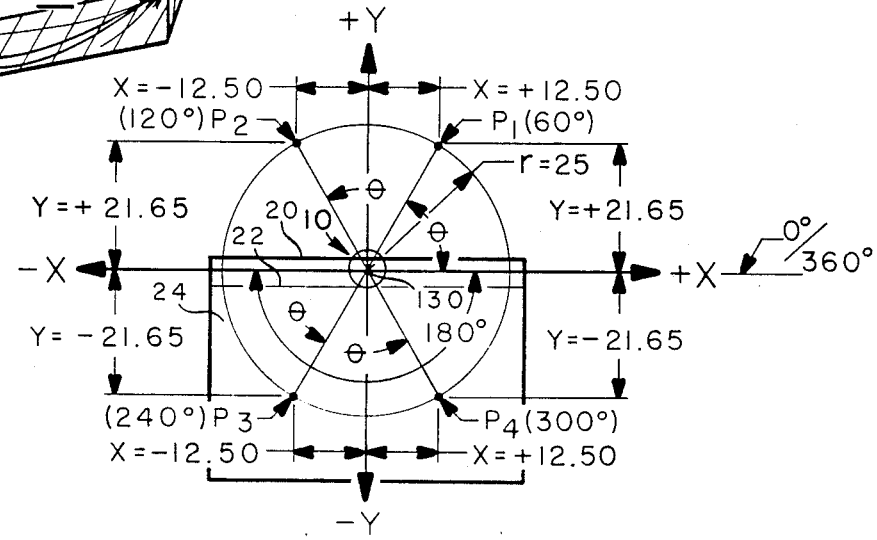
FIG. 2 is a schematic representation illustrating the contemporary electronic method of converting polar coordinates to Cartesian coordinates.

FIG. 2 depicts polar coordinates of four points within the quadrants of perpendicular X and Y axes. Also shown are Cartesian coordinates of the identical points and the formula for their attainment. Digitizer 10 is representatively attached to table 20 to which is affixed document 22 having its surface 24. Superimposed over vertex 130 of digitizer 10 is the intersection of two perpendicular axes, X-axis and Y-axis, each pointing in accordance with the "right hand" rule. The "right hand" rule is with the right hand extended forward and the palm up. Therewith the thumb points to the plus X direction and the extended fingers point to the plus Y direction. (If a third axis were used the fingers bent 90 degrees upward would then point to the plus Z direction.)

As with digitizer 10 the polar angle of 0/360 degrees is located on the plus side of the X-axis. The four points numbered counterclockwise on a circle have a radius of 25 (r =25) which is the radius vertex for each point. The polar angle indicated for each point is represented by the Greek letter theta ($\theta$) and extends from the "fixed" plus X-axis. The value for each polar angle (theta) is shown next to its corresponding point. Hence, the polar angle of point P1 is 60 degrees, point P2 is 120 degrees, point P3 is 240 degrees, and point P4 is 300 degrees.

The formula shown is used to convert polar to Cartesian coordinates. With that illustrated the Cartesian X distance is in each case 12.50 and the Y distance is 21.65. Yet the Cartesian's plus and minus values correspond to those of the polar coordinates'. Thus, it may be seen that digitizer 10 fits into this scheme with using "polar angles" from 180 degrees to 360 degrees.

FIG. 3 shows digitizer 10 attached to table 20 by one of two clamping assemblies. Although the lower protrusion of the cover may be eliminated, and the entire base structure of angular apparatus 14 fitted flat upon table 20 (whereby the clamping arrangement would penetrate through table 20), it is noted that the configuration shown is best desired for use with standard drafting tables. As such, with digitizer 10 arranged as shown large three foot wide drawings or drawing paper may be affixed to the table in front of the digitizer.

Edge 218 (at the far side) is shown abutting the table. Edge 218 and edge 102 (FIG. 1) protects the table from being marred by the threaded shafts of the clamping assemblies. Threaded shaft 220, hex nut 222, a conventional clamp 224, and wing nut 226 are one of two such assemblies positioned equidistant from the center of digitizer 10. In this manner hex nuts 222 will not interfere with linear apparatus 12 when it is rotated from side to side.

Encoder 82 has its circumferential mounting flange 232 mounted upon the spotfaced surface of top plate 62. The plate has a countersunk area coaxial with axis 60 within which the base 234 of encoder 82 is extended. Two additional countersinks also coaxial with vertical axis 60 are provided. One contains a shim spacer 236 retaining the outer race of ball bearing 90 slightly press-fitted into top plate 62. Shim spacer 236 prevents ball bearing 90 from riding up on shaft 84 where the inner race of the bearing might then gall with base 234. The other countersink retains the flange of ball bearing 90. A spring washer 238, having its minor diameter contacting the lower extremity of ball bearing 90's inner race and its major diameter retained by a countersink in top plate 62, applies a spring loaded force to the inner race of the bearing thereby eliminating its radial play. Shaft 84 of encoder 82 penetrates the above and is secured within top plate 62 by set screw 240.

At the opposite extremity of axis 60 thrust ball bearing 92 is slightly press-fitted into bottom plate 40 that retains the bearing's outer race. The inner race is then mounted on one diameter and retained by another diameter of tridiameter shaft 94 also separating bottom plate 40 from base plate 64. There, tridiameter shaft 94 is reduced to yet another diameter. This last diameter is designed so that binding head screw 242 when tightened will press fit shaft 94 with base plate 64. The countersink for screw 242 allows base plate 64 to fit flush with the table.

When ball bearing 90 is secured with the securing of the encoder, the preloading force of spring washer 238 is also introduced into thrust ball bearing 92 thereby eliminating all radial play of linear apparatus 12 in relation to angular apparatus 14.

To circumvent possible doubts concerning side bending or torque of rack 30 when it is extended maximum distances and then rotated from side to side, shaft 84 of encoder 82 exhibits only one inch ounce of torque when rotated. In actual practice when linear apparatus 12 is assembled with angular apparatus 14, a person may blow lightly against a side wall of linear apparatus 12 and that slight force is all required to rotate linear apparatus 12 from one side to the other.

Dust covers 114, 116, and 118 are attached for easy removal when access into linear apparatus 12 is required. Covers 114 and 118, respectively, are inserted into slots 244 and 246 provided along the length of top plate 42. As such the covers need only be secured at the front and rear of the side walls, such as with screws 248 and 250 (one side only shown). A similar slot 252 provided along the top rear edge of cleaner assembly 52 assures a tight seal when the cleaner assembly is vertically adjusted. Cover 116, approximately abutting the cleaner assembly, for easy removal is secured with machine screws such as screw 254. A fourth dust cover 256 is attached with machine screw 258 to the top of bottom plate 40 thereby protecting thrust ball bearing 92.

Perforated rack 30 is coiled against its concave side about a rack holder assembly 260. From there, rack 30 is reversed in direction as it is interlocked against its convex side with a sprocket wheel coupling 262 made integral with shaft 34. When reversed in direction rack 30 is sandwiched between the sprocket wheel coupling and a rack guide assembly 264. Rack 30 is then fed through cleaner assembly 52 and slot 104 of cover 16.

Rack holder assembly 260 involves some basic principles often utilized with conventional push/pull tape measuring rules. These principles as used with rack holder assembly 260 are as follows: A shaft 266 has a centrally located slot through which the proximal end of a negator spring 268 is inserted and secured with a counterclockwise wrap. The opposite end of the spring 268 is then wrapped tightly, counterclockwise, and its distal end is interlocked with the proximal end of rack 30. Two disks such as disk 270 (shown broken for clarity) are aligned one on each side of negator spring 268. As rack 30 is fed over the two disks it is concentrically coiled around the disk's edges as they rotate about shaft 266 as negator spring 268 unwinds from its tightly wrapped position.

Separate from the above principles, rack holder 260 generally embodies other advantages such as a rotatable shaft and also elements to conduct electrical power to and from push button switch 216 (FIG. 1). These new advantages, and also the new mechanics of circular disk holders, such as disk holder 272 (one side only shown), will be shown more in detail and described with relation to FIGS. 4-6. Each disk holder, usually containing three alignment disks 274, 276 and 278, is attached to the inside of a housing vertical wall with screws 280, 282, and 284 the ends of which may be seen secured in disk holder 272. The functions of the disks are for initial alignment of rack 30 that will be fully described and explained with FIG. 7.

Wire bundle 182 is secured with a grommet 286 in wall 36. Once inside the wall the protective covering of the bundle is stripped away and its two pairs of wires 288 and 290 are attached to spring backed terminal brushes contained within the (electrically insulative) disk holders such as holder 272 shown. The pair of wires 288 has each wire connected to a separate terminal brush 292 (only one shown), and the pair of wires 290 (shown sectionalized) has each wire similarly connected to a terminal brush contained within the opposite and opposing disk holder.

Two pairs of wires such as wire pair 294 are embedded in the concaved side of rack 30. This way they lie between two flexible, insulative coatings 296 and 298. The wires generally run in a zigzag pattern to prevent breakage when stretched and contracted as rack 30 is extended and retracted.

Sprocket wheel coupling 262 has three circular segments coaxial with its axial member. The central segment, centerwheel 300 (shown sectionalized), is located whereby the centerline of its width is coaxial with centerline 144 (FIG. 1) of rack 30. It may be retained with a set screw 302 usually soft tipped to prevent marring shaft 34. Rack 30 rides on centerwheel 300 and the diameter of the centerwheel in turn regulates how far rack 30 will move in relation to one rotation of shaft 34. The diameter plus the thickness of rack 30 times the value of pi (3.14159--) will equate to that distance.

A sprocket wheel is aligned one on each side of centerwheel 300. The sprocket wheels have a lessor diameter than centerwheel 300. Therefore, the outside diameter of the wheel beyond centerwheel 300 in FIG. 3 cannot be seen. What may be seen however are a plurality of sprockets 304 held by one of the sprocket wheels. The sprockets mate exactly, as will become apparent with this specification, with the perforations of rack 30 where they are radially bent about centerwheel 300. As will be described and explained, the diameter of centerwheel 300 is "approximately" equal with the diameters of the sprockets (on the sprocket wheels) where their straight sides are tangent to the radiused extremities leading to their tips. For clarification here with FIG. 3, the illustrated circle appearing to encompass the extremities of the sprocket tips is a hole in the far wall with the hub of encoder 32 penetrating therethrough (better seen with FIG. 7).

When rack 30 is extended or retracted, the perforations in the rack fall and rise at the radial bend around the centerwheel. They fall with the normal deformation of the rack being straightened laterally when approaching the centerwheel. Then the perforations rise with the rack again assuming its cross-sectionally curved shape after leaving the centerwheel. When the perforations fall as described they do not abut the sprockets. Rather, the perforations fall around and lock with the sprockets firmly adhering to them. It may be visualized that each perforation in the entire length of the rack is mated with only one individual sprocket. It will be explained in detail how no tolerance exists when interlocking of the perforations and sprockets takes place. Though various numbers of sprockets may be used, of the 36 total sprockets indicated (one side only shown) 20-22 of these are at all times in constant engagement with perforations of rack 30.

The amount of torque required to rotate shaft 34, as explained, is only one inch-ounce. This torque is easily overpowered when extending or retracting rack 30 whereby 20-22 perforations are ring fitted with the sprockets, and also whereby frictional engagement takes place between rack 30 and centerwheel 300. When moving rack 30 relative to shaft 34 being rotated, or when rotating shaft 34 relative to rack 30 being moved, the slightest linear micromovement will be reflected simultaneously between the shaft and rack. These elements move as one. The simultaneous movement of the two will be reflective regardless of where cursor assembly 18 may be extended on surface 24 (FIG. 1).

As a point of interest rack 30 in digitizer 10 was tested for durability. The rack was violently extended and retracted at speeds to and exceeding 1,750 rpm and to distances of more than five feet while simultaneously twisting it and skewing it from side to side and up and down. The purpose of the test was to introduce "wear" into the perforations, and also to ascertain the conditions required to tear the rack. More than 5,500 such extensions and retractions (in excess of 11,000 total mating times of each perforated hole with its sprocket) were required with such violent actions to purposefully tear the rack. It finally tore from a perforation to its adjacent side of the rack. The rack was then disassembled from digitizer 10 and the perforated holes were carefully examined with a fifty power microscope calibrated to measure less than 0.0005 inch. Absolutely no wear of the perforated holes (or the sprockets) could be determined. Measured before and after the test the holes were the same diameters as the sprockets.

Guide assembly 264 embodies two guide wheels 306 and 308 centrally molded upon their respective shafts 310 and 312. The wheels when cured undergo an approximate three percent shrinkage factor. The shafts are roughened where the wheels are molded to them thereby creating a tight, nonslip fit when the wheels are cured. Shafts 310 and 312 rotate freely within bearings (not shown in FIG. 3) retained within the parallel sidewalls of a bifurcated bracket 314. The bracket is slidably adjusted along centerline 316 bisecting the center of shaft 34.

A plate 318 is attached with screws (not shown in FIG. 3) to 45 degree chamfers at the lower rear corners of wall 36 and wall 38 (FIG. 1). Centrally located within the plate is a threaded hole coaxial with centerline 316 that is mated with a hand adjustment screw 320 penetrating into an in-line hole at the base of bracket 314. When the adjustment screw is tightened guide wheels 306 and 308 will equally impinge upon rack 30 and sandwich it between the wheels and centerwheel 300.

When rack 30 is retracted into linear apparatus 12 it is interlocked with sprocket wheel coupling 262 then rotating in a counterclockwise manner. Negator spring 268 wanting to unwind is consistently pulling rack 30 about the disks such as disk 270 shown. If rack 30 however should inadvertently be pushed at a speed faster than the "pulling" capability of the negator spring, then guide wheels 306 and 308 will prevent rack 30 from being "pushed off" from sprocket wheel coupling 262, and also aid to push the rack against rack holder assembly 260. In this manner negator spring 268 is assisted and allowed to rapidly uncoil thereby assuring that rack 30 is consistently coiled tightly around the disks. When extending or retracting rack 30 by hand no slackness will exist in relation to its position as shown in FIG. 3.

Parallel with centerline 316 two slots 322 and 324 are provided in wall 36 and wall 38 (FIG. 1). Two shafts 326 and 328 each threaded at both ends penetrate through (and are attached in) the base of bracket 314. Shafts 326 and 328 extend through the slots to the outsides of the walls where they are provided with hex nuts (not shown with FIG. 3) to lock guide assembly 264 into position following its adjustment. Because the slots are slightly larger than the shafts slidable within them, wheels 306 and 308 will find their own equally balanced impingement points when sandwiching rack 30 against centerwheel 300.

The interlocking of rack 30 with sprocket wheel coupling 262 is not dependent upon rack holder assembly 260 or guide assembly 264. Many types of rack holders and guide assemblies may be employed, and under various circumstances not even utilized. For example, rack 30 shown dashed (and also broken for clarification and to avoid mingling of lines) may be seen extended horizontally from the top of sprocket wheel coupling 262, and the rack there given the designations 30a and 30b. In that fashion, the interlocking of the rack with sprocket wheel coupling 262 is equally effective when alternately retracting the ends of the rack.

Toward the lower front of linear apparatus 12 is another pair of disk holders such as the rectangular disk holder 330 attached with screws 332. They are aligned on each side of rack 30 and each is attached to a vertical wall as indicated. These holders each contain a disk 334 also slidably adjustable and identical in shape with the disks held by the circular disk holders above them. With disks such as disk 334, however, each has machined across its center a V-groove 336. The V-groove is used to retain an edge of rack 30 slid in it during alignment (to be explained).

Now advancing to FIG. 4, please notice that its section indicated here with arrows 338 and 340 is for clarity extended as though the section were taken from a whole view. Shaft 266 of rack holder 260 may be seen interference fitted with walls 36 and 38. The shaft abuts the inside of wall 36 and is there reduced to a diameter that is threaded to receive locking nuts 342 used to lock the shaft in any position. At the shaft's opposite extremity a pin 344 secures a hand knob to the shaft.

The major purpose of the arrangement described is to adjust the tension of negator spring 268 whereby rack 30 when extended over surface 24 (FIG. 1) and released will not creep either forward or backward. With locknuts 342 loosened, turning knob 346 clockwise will tighten the coil made by the negator spring. Then, after rack 30 is extended the negator spring wanting to uncoil will pull back rack 30. Turning knob 346 counterclockwise will uncoil the negator spring thereby giving it less ability to pull back rack 30. By extending rack 30 while adjusting knob 346 a balanced position may be attained whereby rack 30, especially with the weight of cursor assembly 18 attached, will not creep and will remain motionless when placed anywhere upon surface 24 (FIG. 1). At that position locknuts 342 are tightened to retain the shaft.

Another purpose for the selective rotatability of shaft 266 is initial coiling of the very long negator spring that otherwise would be a very time consuming effort. Also as explained, the negator spring is dependent upon to pull and wrap rack 30 around the disks. Knob 346 is then used to complete this task. The negator spring is usually not as wide as the rack because the pulling force of a wide spring is not required. As such, it has been found that while using a narrow negator spring a more comprehensive "balancing" position may be attained when adjusting the rack to remain motionless when extended and released.

A spool 348 may be seen on shaft 266. The spool embodies a centrally located slot extending through its two axial walls, and that is equal dimensionally with the slot in shaft 266. The spool fits between shaft 266 and negator spring 268, and is interference fitted with the shaft. The proximal end of the negator spring is secured through the aligned slots, and its remaining length is coiled counterclockwise about spool 348. The slot in shaft 266 is not a singular method of securing the spring. It could as well be secured with a machine screw through the spool and into the shaft.

Each outside surface of the spool's flanges is machined with two embossed surfaces 350 and 352. The surfaces being lubricous align disk 270 and 354 that are rotatable about shaft 266. Each disk (made with an electrically nonconductive materal) has molded in it two electrically conductive rings 356 and 358. The rings conduct electricity from terminal brushes such as brushes 292 and 360 each backed by compression springs such as springs 362 and 364.

The electricity from the pair of wires 288 to terminal brushes 292 and 360 is conducted through the rings within disk 270. The pair of wires 290 conducts electricity through the rings within disk 354. That electricity is then fed to rack 30.

The fashion in which disk holders 272 and 366 are attached may be seen here with screws 280 and 368. Each screw penetrates a hole in a vertical wall and draws the disk holder tightly against it. Disks 278 and 370 are adjusted with screws 372 each having a locking nut 374. The rectangular disk holders are attached in a like manner.

FIG. 5 shows rack 30 (broken for clarity) interlocking with negator spring 268. Also, the manner in which electrical power is conducted to the rack is shown. The distal end of the spring is fitted over the rack where the spring's sides (notches) are interlocked with a triangular cutout in the rack. This standard procedure is referenced to illustrate how the spring holds rack 30 tightly against disks 270 and 354. With the wrapping of the rack about the disks, the grip of the rack becomes more firm with each wrap until peeled off in the direction of arrows 376 and 378.

When coiled, the proximal end of the rack is pulled clockwise while its distal end is subjected to being pulled counterclockwise. The result is that the rack is wrapped in a tight manner. It will not slip about the disks because of friction whereby seizure takes place. Each wire of the pair of wires 294 is inserted into terminals 382 and 384 (the wire to terminal 382 is shown not yet attached) and there soldered. The pair of wires 380 are similarly installed within terminals 386 and 388. Once coiled the rack will not slip about the disks, an action that could break the wires.

FIG. 6 is typical of each disk. Conductive rings 394 and 396 may be seen incorporating notches to hold them firm. Also, molded within disk 354 is a metal strip 398 solder connected to ring 394 and terminal 386. Similarly, a metal strip 400 connects ring 396 with terminal 388. These metal strips complete the electrical power conductivity between receptacle 202 and push button switch 216 (FIG. 1).

Figure 7:
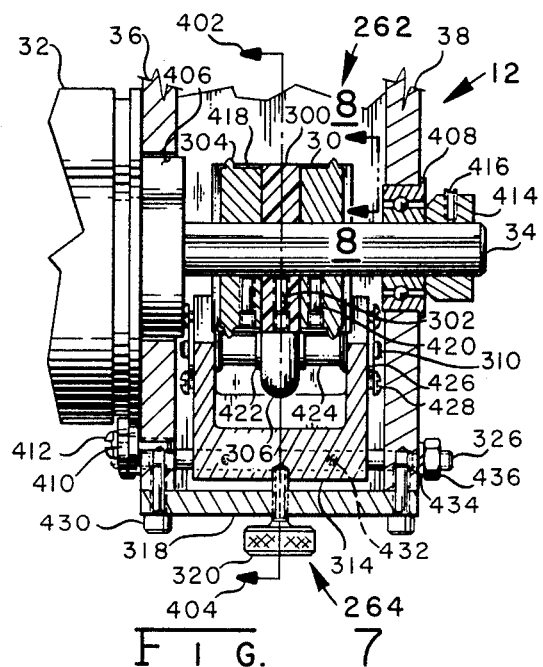
FIG. 7 is a section view taken from FIG. 3, and depicts a sprocket wheel coupling and rack guide of the linear measuring apparatus.

FIG. 7, taken from FIG. 3 in the direction shown here with arrows 402 and 404, is also for clarity extended as though taken from a whole view. In this manner, encoder 32 may be seen "float mounted" whereby an open tolerance is left around its hub 406 permitting the encoder to be centered where shaft 34 penetrates ball bearing 408 retained with the heads of binding head screws (shown in FIG. 1) in wall 38. When so positioned the encoder is secured against the spotfaced wall with mounting cleats 410 and screws 412. Any radial play is then eliminated from bearing 408 by gently applying pressure against its inner race with the chamfered end of a collar 414. With the radial play eliminated the collar is retained with screw 416.

Guide wheel 306 of the guide assembly may be seen in the position abutted against rack 30. On each side of the guide wheels are laminated shim spacers 422. Shaft spacers 424 generally separate the shim spacers from oil-impregnated bearings 426 retained with binding head screws 428. In this manner shaft 310 penetrating the two bearings is allowed to rotate freely with the guide wheel to which it is attached. Here also may be seen screws 430 securing plate 318, retaining screws 432 retaining shaft 326, and lockwashers 434 with hex nuts 436 securing shaft 326.

Mating the perforations with sprockets 304 where no appreciable tolerance exists is accomplished simply and rapidly. In practice, the holes are produced while the rack is bent about a radius consistent with the radius of centerwheel 300, and the holes are fabricated having slightly smaller diameters than the diameters of the sprockets. As such, the holes are rapidly "worn" to the diameters of the sprockets.

The alignment of rack 30 is accomplished by initially assuring that retaining screw 302 and the two retaining screws 420 are loosened whereby centerwheel 300 and the two sprocket wheels 418, although snug, may rotate about shaft 34. Hex nuts 436 on shaft 326 and shaft 328 (FIG. 3) are then loosened, and guide assembly 264 is backed from sprocket wheel coupling 262. Then the distal end of the rack is radially bent about the sprocket wheel coupling (in the direction shown by FIG. 3). The tips of sprockets 304 will then only partially penetrate the smaller holes produced in the rack.

With the rack positioned as described the three alignment disks in each disk holder, such as disks 278 and 370 in disk holders 272 and 366 (FIG. 4), are adjusted inward to forceably square the coiled sides of rack 30 (the disks in this position are shown dashed in FIG. 4). When squared the disks are then adjusted to slightly touch with no tolerance the squared sides. The disks are then locked in that position by firmly tightening hex nuts 374 (FIG. 4) against walls 36 and 38. The alignment disks in each of the lower disk holders such as disk 334 in disk holder 330 (FIG. 3) are adjusted also having no tolerance, and locked in position with the sides of rack 30 inserted into the V-grooves machined across the ends of the disks. During this adjustment period it is assured that rack 30 is centered between walls 36 and 38.

Guide assembly 264 is adjusted with adjustment screw 320 so the guide wheels touch rack 30. With the cleaner assembly removed the rack is extended 5 to 6 feet and returned. This process is repeated 8 to 10 times with the adjustment screw consecutively tightened until rack 30 is snugly sandwiched between the guide wheels and centerwheel 300. Of course, when linear apparatus 12 is used only for linear measurements, the above is accomplished by alternately retracting the ends of the rack as previously explained. Any slight dimensional discrepancies of the individual sprockets (plus and minus fabrication tolerances with fabrication limitations) will be nullified because the perforations will rapidly "wear" to fit them (each perforation being mated with only a singular sprocket). The sprocket wheel's retaining screws 420 and the centerwheel's retaining screw 302 are secured at that time.

Following alignment, all of the disks in each of the four disk holders are backed from the rack and adjusted flush with the inside surfaces of the disk holders. Also, as a precaution if the rack should require future removal, it is extended to a maximum length and two sprockets (one on each side of the centerwheel) together with their mated sprocket holes are marked with a scribe or dabs of paint. Without such markings extreme difficulty would be encountered to again align the perforations with their respective sprockets.

Figure 8:
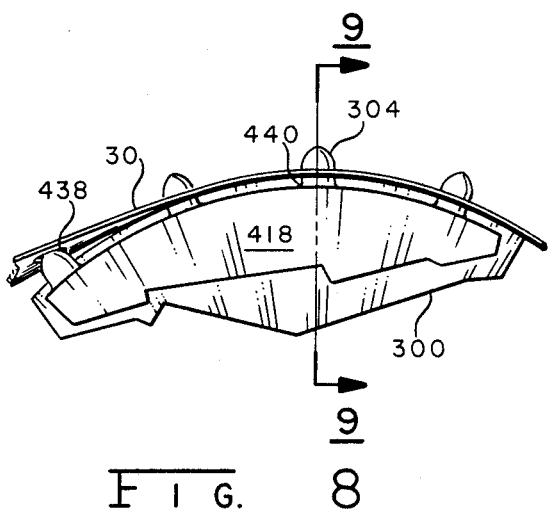
FIG. 8 is an enlarged view, taken from FIG. 7, illustrating a principle used for the interconversions of linear and rotary motions.
Figure 9:
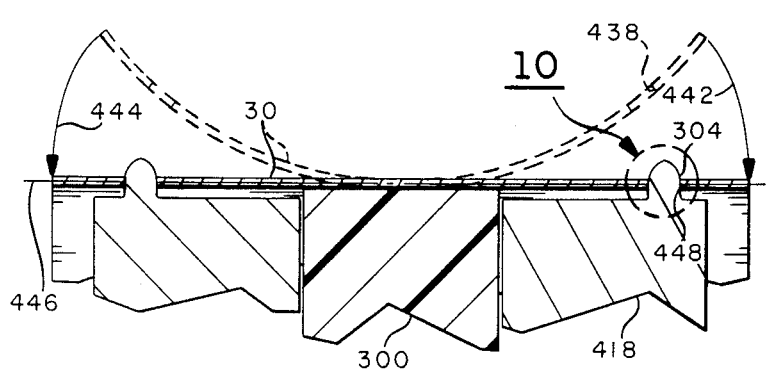
FIG. 9 is a section view taken from FIG. 8, and indicates motions of the perforated rack when interlocking with sprockets of the sprocket wheel coupling.
Figure 10:
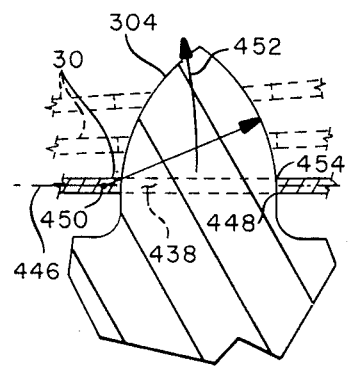
FIG. 10 is an enlarged detail of actions that occur when interconverting linear and rotary motions.

FIGS. 8, 9, and 10 show the interlocking enlarged for clarification of rack 30 with the sprocket wheel coupling. FIG. 8 shows an enlarged breakaway of these components. It depicts how the sprockets 304 do not abut with the perforated holes 438 as the holes engage them. Also, it shows that the base radii 440 of the sprockets on the sprocket wheel 418 do not interfere with the interlocking of the holes and sprockets.

With FIG. 9 gaps between centerwheel 300 and the sprocket wheels 418 may be seen. Each sprocket wheel independently allows its sprockets 304 to find the most applicable mating arrangement with its related row of holes in the rack. Here also it may be visualized that sprocket wheels 418 need not be limited to two. Additional rows of holes in the sides of the rack can be perforated whereby additional sprocket wheels may be utilized with them. Also, the holes in one row need not be laterally parallel with the holes in another row. And if desired, only one row of holes may interlock with the sprockets of only one sprocket wheel.

Various combinations may be used for sprocket and hole engagements. For example, two rows of engagements are used with digitizer 10 because rack 30 is rotated from side to side and the perforations are therefore subject to lateral wear. If linear apparatus 12 is used only for linear measurements, only one row of interlockings may be sufficient. Again, if the sprockets are used to drive the rack such as where measurements may be taken in a dangerous environment, two or more rows might be used. Also, a sprocket wheel might contain one or a number of sprocket rows and have sprockets of various shapes such as round, square, rectangular, oblong, and more. With digitizer 10, circular shaped sprockets are shown because less machining is involved when ring fitting them with their respective holes.

Rack 30 in its normally curved position is indicated with dashed lines. When the rack is reversed in direction and radially bent about the centerwheel, its sides deform and fall in the direction of lines with arrows 442 and 444 to the straight position shown sectionalized. Because of the elliptical geometry involved, the closer rack 30 assumes the straight position (sectionalized) the more vertically the sides fall. Because of this phenomenon there exists no perceptible galling between the sides of holes 438 with sprockets 304.

It may be visualized that the curvature of the rack may be even more pronounced. The greater the curvature the longer the length may be extended without sagging. Also the width may vary. By varying the curvature and the width, and even the thickness, the rack may be made to encompass wide varieties of measurement capabilities.

When bending metals it is well-known that calculations of "developed lengths" are based upon centerline lengths. Lateral centerline 446 is illustrated to describe this principle. When flat (shown sectionalized) the widths of the rack along the top, centerline, and bottom are all equal. However, when the rack assumes its normally curved position (shown dashed) the developed width of its top surface is slightly reduced, the developed width of its centerline remains constant, and the developed width along the bottom surface is slightly increased.

The above principle is utilized when mating the holes with sprockets. When mating, at the last instant the bottom 448 of each hole will close and fit tightly to the sprocket. Conversely, when leaving the sprocket, at the first instant the bottom 448 of the hole will open and release from the sprocket allowing rack 30 to assume its normal cross-sectionally curved position.

With the rack installed reversed (rotated 180 degrees about its longitudinal axis), its center rather than its sides is the first to part from the centerwheel when the rack straightens from its radial bend. The bottom of the holes then would begin to close against the sides of the sprockets causing a cupping action and not wanting to release. To avoid such a condition sprocket inclinations and alignment lands are used as taught in my U.S. Pat. No. 4,506,336.

At times other disciplines have been taught whereby holes are produced along the longitudinal centerline of a member such as rack 30. It may be visualized looking at FIG. 9 that the center is the "working" portion of the rack. With a row of holes punched along the centerline the rack could soon split into two lengths if radially bent as with rack 30.

The lifting of holes 438 from sprockets 304 is illustrated in greater detail with FIG. 10. Shown are a typical sprocket 304 and how its radius is taken from a common tangency point 450. Ideally, because plus and minus tolerances must be considered, centerline 446 is designed to bisect the point 450. Then, as the hole 438 is "lifted" in the direction of the line with arrows 452, the bottom side of the hole will open as the top 454 of the hole slides from the tapering radius of the sprocket.

Thus, the mating of holes and sprockets may now be visualized. Rack 30 when extended, retracted, and rotated from side to side is always moved having no perceptible backlash, sidelash, or hysteresis with relation to the sprocket wheel coupling 262. Any movement of the rack will be reflected simultaneously relative to encoders 32 and 82 (FIG. 3). This is significant because measurements having repeatability may then be produced. If tolerances existed even though slight, one reading would be indicated when extending the rack and another reading would be indicated when the rack was retracted.

Figure 11:
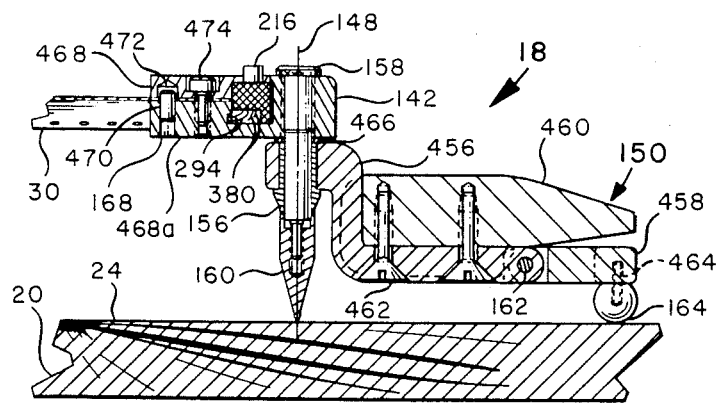
FIG. 11 is a section view taken from FIG. 1, and depicts details of a cursor assembly holding a scribe and attached to the end of the perforated rack.

A cursor assembly similar to cursor assembly 18 shown with FIG. 11 is taught in my U.S. Pat. No. 4,506,336, and to a degree in my U.S. Pat. No. 4,419,672. Although cursor assembly 18 has been improved with the configuration herein described, those patents by reference for their teachings are incorporated here.

With FIG. 11, cursor guide 150 has a Z-shaped bracket 456 tongue and grooved with a T-shaped bracket 458 pivotal about adjustment screw 162. Bracket 456 supports a plastic handle 460 held by self threading screws 462, and bracket 458 is supported by sliding balls 164 and 166 (FIG. 1) secured with threaded shafts 464. Because of the chamfer at the bottom rear corner of handle. 460, bracket 458 may pivot up and down about screw 162. As viewed in FIG. 1 cursor guide 150 is so adjusted whereby vertical axis 148 is made perpendicular to surface 24 thereby assuring the two edges of rack 30 are parallel to the surface of the table.

Scribe 158 is threaded through cursor 142. Insert 156 is penetrated through bracket 456 with a no-tolerance swivel fit, and whereby the length penetrating bracket 456 is slightly longer than the thickness of the bracket. Spacer 466 usually made of the same material as insert 156 is slipped onto scribe 158. Insert 156 then penetrating bracket 456 is interference fitted with scribe 158. This arrangement locked together with tip 160 threaded onto scribe 158 allows cursor guide 150 to rotate about the spool made by insert 156 and spacer 466. Also, when rack 30 is extended and retracted, no backlash exists with tip 160 in relation to any movement of rack 30 or encoder 32.

Cursor 142 embodies an upper segment 468 and a lower segment 468a. The upper segment is machined with a concave cut and the lower segment is machined with a convex cut. These semicircular cuts sandwich the rack, and each is machined with a radius equal with that of centerline 446 (FIG. 9) with rack 30 in its normal cross-sectional state. In this manner, when the rack is sandwiched its sides are initially pinned between the cuts thereby automatically aligning the centerline of cursor 142 with the rack's centerline 144 (FIG. 1). Also, only one machine screw is required to sandwich the rack.

Positioning of the rack between the segments is accomplished with a hole through the centerline of the rack interference fitted with a dowel pin 470 press fitted into lower segment 468a. The hole with which the pin is fitted is hole 168 used to align cursor assembly 18 with cursor holder 129 (FIG. 1). A recess 472 allows the top of the pin to penetrate therein.

The pair of wires 380 are attached to push button switch 216. The pair of wires 294 are here shown sectionalized. Upper segment 468 and lower segment 468a are machined to contain the switch. The assembly with rack 30 sandwiched therein is held together with screw 474 countersunk and flush with the top surface of segment 468.

Figure 12:
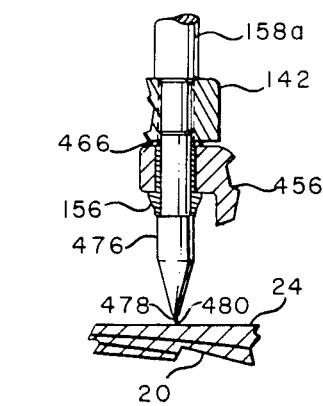
FIG. 12 is an alternative to FIG. 11, and depicts the cursor assembly containing a mechanical pencil representative of a marker.

FIG. 12 depicts how mechanical pencil 158a rather than scribe 158 (FIG. 11) may be fitted with cursor 142. The mechanical pencil prior to machining is usually a commercially available pencil normally used in an upright, vertical position. Its tip 476 has a barrel 478 through which lead 480 is fed. An ink marker as well as a pencil marker may be used and fitted similarly.

The shaft of the pencil is threaded to match the threaded hole in cursor 142, and the lower portion is machined to mate with insert 156. With these machining operations it is secured with cursor 142 in the same manner as is scribe 158 (FIG. 11). Also in the same way, spacer 466 and insert 156 penetrating bracket 456 are placed upon the shaft, with tip 476 used rather than tip 160 (FIG. 11). Mechanical pencil 158a can function as scribe 158 (FIG. 1), and has the added capability of drawing or marking on the surface.

Figure 13:
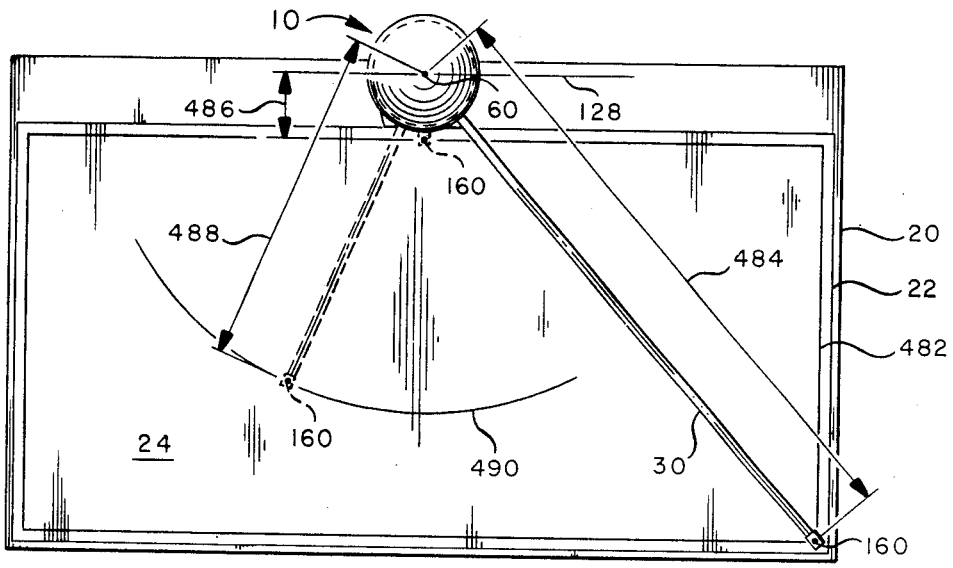
FIG. 13 is a semischematic view, and indicates a number of polar coordinates capable of being digitized on a normal working or drafting table.

FIG. 13 is a semischematic drawing illustrative of typical point location coverage by tip 160 on surface 24. Here, digitizer 10 is centrally located on table 20 and abutted by document 22 having a borderline 482 drawn upon its surface. FIG. 13 is referenced to the example explained with FIG. 1. There, the example was described whereby encoder 32 emitted a pulse for each 0.0036 inch of linear movement by rack 30, and encoder 82 emitted a pulse for each 0.0091 inch of lateral rotational movement of rack 30 when extended to a distance of 52.38 inches.

Tip 160 schematically shown at the distal end of rack 30 is depicted at three different distances from vertical axis 60. Distance 484, 52.38 inches, is representative of the longest radius vertex described. Distance 486, 5.41 inches, is representative of the shortest radius vertex used on that surface. Distance 488, 28.895 inches, is representative of a radius vertex distance equal to one half the distance between distances 484 and 486.

The linear distance per pulse moved by tip 160 is constant. However, when tip 160 is rotated from fixed axis 128 the circumferential distance traveled by tip 160 between consecutive pulses varies. That distance is equal with the radius vertex of tip 160 times two times pi (3.14159--) divided by 36,000 pulses (example given) per revolution of encoder 82. The circumferential distance traveled by tip 160 at distance 484 is 0.0091 inch per pulse. At distance 484 it is 0.0009 inch per pulse, and at distance 488 it is 0.005 inch per pulse.

The average tolerance window then, made along polar angle line 490, is 0.0036 inch by 0.005 inch. Therefore, it may roughly calculated that tip 160 will indicate an average 55,555 separate "window" addresses per square inch on surface 24 ((1.00 inch divided by 0.0036 inch) times (1.00 inch divided by 0.005 inch)). Because surface 24 inside of borderline 482 is approximately 34.00 inches by 69.00 inches (2,346 square inches), approximately 130 million location addresses (2,346 square inches times 55,555 addresses per square inch) may be indicated with digitizer 10 inside of borderline 482. If four times that many addresses were desired (above one-half billion) the pulse counts of encoders 32 and 82 would simply be doubled.

Figure 14:
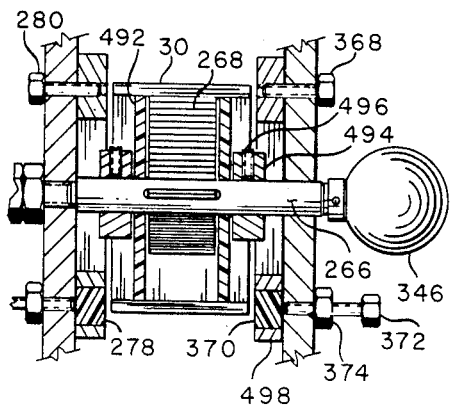
FIG. 14 is a sectionalized view, similar to FIG. 4, illustrating the rack holder without a requirement of electricity being conducted therethrough.

FIG. 14 depicts a view similar to rack holder 260 shown with FIG. 4. The rack holder with FIG. 14 is arranged without the requirement for electricity to be conducted through it. Negator spring 268 is inserted through the slot in shaft 266, reversed wrapped, and its distal end is wound around shaft 266 rather than around spool 348 (FIG. 4). Two collars 494 with set screws 496 at times secure disks 492 between the collars and negator spring 268. It has been found that the collars 494 although not necessary aid when assembling rack 30 to the negator spring. A pair of disk holders 498 containing three disks each are used, and the components described are used for the same purposes as previously explained with the rack holder 260 shown with FIG. 4.

Figure 15:
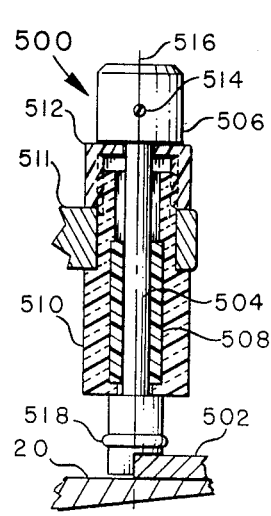
FIG. 15 is a sectional view of a cursor assembly used with machining operations when digitizing distances between surfaces.
Figure 16:
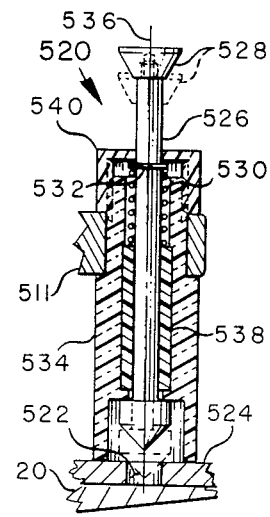
FIG. 16 is a sectional view of a cursor assembly used with machining operations when digitizing distances between hole centerlines.

FIGS. 15 and 16 illustrate additional cursor assembly arrangements when this invention is used with machining functions. Significant uses are for marking where machining operations are to be performed, and when inspecting operations produced. Although many measurement indicating devices may be designed to fit the rack, basic cursors are shown.

FIG. 15 depicts cursor assembly 500 primarily used when measuring between two surfaces such as the opposite ends of plate 502 contacted by the lower extremity of shaft 504 when turning knob 506. A lubricous plastic rod line bored to form bearing 508 is molded into a circular handle 510 usually made using plastic having good optical qualities. In this manner, maximum vision is afforded so care may be exercised that the contact point does not become unduly chipped or scratched when digitizing measurements. The upper extremity of the handle is reduced to a smaller diameter threaded at the end where inserted, with a no-tolerance fit, through a hole in cursor 511. Cursor 511 with exception of the larger hole for handle 510 is machined similar to cursor 147 (FIG. 11). Handle top 512 is female threaded to fit the threaded diameter of handle 510 thereby firmly securing the handle assembly with the cursor.

Shaft 504 is inserted through the handle assembly having a no tolerance fit between it and bearing 508. The shaft's lower extremity is machined to a larger diameter abutted against handle 510. Knob 506 is secured with set screws 514, and thereby sandwiches the handle assembly between the knob and shaft abutment.

The bottom of shaft 504 at times embodies a 90 degree cutout extending to the shaft's centerline 516. The cutout is used to fit around an upper corner of the work measured. In this manner measurements may be taken by rotating knob 506 to encompass opposite parallel edges. When marking dimensions where machining operations are to be performed, a marking scribe may be used along the cutout's lower vertical surface at centerline 516.

Another method of measuring the length between surfaces is with the spherically radiused ring 518 on the lower diameter of shaft 504. The ring is used when measuring the work, and its diameter is appropriately added or subtracted from measurements taken.

FIG. 16 shows cursor assembly 520 primarily used when marking or measuring hole locations. It is shown measuring the center distances between holes such as hole 522 in plate 524 on table 20.

When marking, shaft 526 is depressed with finger knob 528 thereby compressing spring 530 with retaining ring 532 fitted onto the shaft. The tip of the shaft may then be used for marking work painted with paint such as steel blue marking fluid.

When the centerlines between holes are measured, the bottom of the transparent handle 534 is usually slid along the work assuring the cursor assembly's perpendicularity. When a hole is approximately centered, knob 528 is depressed allowing the shaft's tapered, self centering bottom to align with the centerline of the hole.

Bearing 538 is molded onto handle 534, and shaft 526 is inserted with a no-tolerance fit through the bearing. Spring 30 and its retaining ring 532 are placed upon the shaft, and handle top 540 sandwiches cursor 511 between the top and handle. Top 540 is also a stop for retaining ring 532 when compression spring 530 pushes against the ring. Finger knob 528 is screwed onto shaft 526, and when depressed maintains centerline 536 perpendicular with cursor 511.

Figure 17:
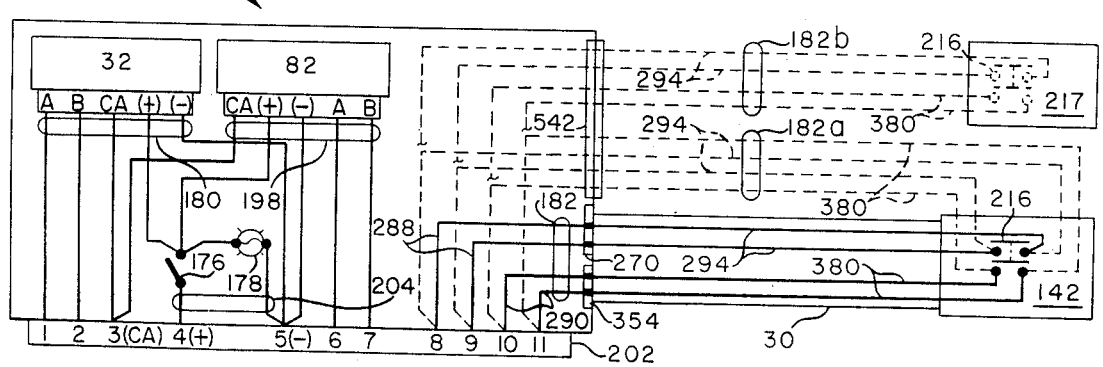
FIG. 17 is an electrical schematic representation illustrating electrical conductivity of the measurement digitizer.

FIG. 17 is a schematic diagram of the electrical arrangement of digitizer 10. The wiring usually leads to receptacle 202, a connector having multiple pins. The remaining pins (not shown) are used as spares so that other equipment such as a counter, converter, microprocesser, or the like may be located inside the cover of the digitizer. For clarification wire bundles 180, 182, 182a, 182b, 198, and 204 are also schematically indicated.

Pins 4 and 5 are connected across a voltage source (not shown). Pin 4 through on and off switch 176 is usually the common feed to the encoders and to the light 178 (usually a light emitting diode). The common return is shown here with pin 5. Encoders 32 and 82 (each employing a case ground) show the case ground pins connected with pin 3. Pins 1 and 2 carry data A and data B signals from encoder 32, and pins 6 and 7 carry the data A and data B signals from encoder 82.

Wire bundle 182 carries the pair of wires 288 and 290 to disks 270 and 354. The pair of wires 294 and 380 (embedded in rack 30) continue the electrical conductivity between the disks and push button switch 216 located in cursor 142. When the pairs of wires 294 and 380 are not carried by rack 30 they are fed (shown dashed) through grommet 542 and carried by wire bundle 182a to the push button switch located in the cursor. When convenient to locate the switch away from the cursor, this condition is shown with the pairs of wires 294 and 380 carried in bundle 182b to the switch located in push button switch holder 217.

The conductors used to signal polar positions are connected to pins 9 and 10, and their returns are connected to pins 8 and 11. As shown these conductors are usually isolated from the conductors to and from the encoders. The reason is to accommodate various types of equipment possibly used with the digitizer. For example, if connected with a pulse counter that in turn is connected with a polar to rectangular coordinate converter, the output from the converter may then be tapped and connected through pins 8 and 9 or 10 and 11. Then, the push button would be used to signal the converted Cartesian coordinate signals from the converter. Another example, if digitizer 10 is connected with a mainstage computer, the signals to the push button switch would be conducted from the computer.

With the arrangement shown, pins 1 and 2 will supply pulse indications for the radius vertexes, and pins 6 and 7 will supply those for the polar angles. The radius vertexes and polar angles thereby constituting the polar coordinates. Or, if desired the user may utilize only one encoder or each encoder separately. When used as such, they are signaled by switches 216a and 216b not shown in FIG. 17 but depicted with FIG. 1. In effect, the user has the capability of signaling the electronics of digitizer 10 from any desired location.

I claim:

1. A product for bidirectionally interconverting linear and rotary motions; said product comprising: a rotatably mounted sprocket wheel coupling including a wheel for regulating linear and rotary motions, and further including sprockets coaxial with said wheel; and a coilable rack having perforations and convex surface means for flattening about said wheel, the flattening of said convex surface means causing said perforations to respectively interlock with said sprockets thereby permitting said linear and rotary motions to be directed and received in equal amounts.

2. The product of claim 1, further comprising a housing, and further including axial means, said sprocket wheel coupling mounted to said axial means, and said axial means rotatably mounted to said housing.

3. The product of claim 1, wherein said wheel forms a diameter, said sprockets have bases that form a diameter, and said sprockets have tangencies that form a diameter, and wherein said diameter formed by said bases is smaller than said diameter formed by said wheel, and said diameter formed by said tangencies is larger than said diameter formed by said wheel.

4. The product of claim 1, wherein each of said perforations is produced perpendicular to the rack while the rack is bent about a radius consistent with a radius of said wheel.

5. The product of claim 1, wherein said perforations are arranged in at least one row longitudinally disposed along at least one side of the rack.

6. The product of claim 1, wherein said perforations are spaced along the rack with a prearranged spacing, and wherein said sprockets have pitches with the same prearranged spacing as said perforations.

7. The product of claim 1, wherein said perforations are preworn with said sprockets.

8. The product of claim 2, wherein said sprockets are arranged in at least one row contained on at least one segment axially adjustable along said axial means, said sprockets coaxial with and adjacent at least one side of said wheel.

9. THe product of claim 2, further comprising an adjustable rack guide assembly mounted to said housing with an adjustable bracket having a major axis directed toward a major axis of said axial means, and the rack guide assembly and said housing including adjustable means for sandwiching the rack against said wheel.

10. The product of claim 2, further comprising a rack holder assembly having a rotatable central shaft mounted to said housing, said rack holder assembly for receiving a proximal end of the rack and for storing a portion of the rack in the form of a coil.

11. The product of claim 10, wherein said rack holder assembly further comprises means for adjusting and locking the central shaft, a negator spring coiled around the central shaft and coupling the central shaft with the proximal rack end, and rotatable disks mounted on the central shaft, said portion of the rack being coiled around the disks.

12. A precision linear measuring device comprising:
a rotatable sprocket wheel coupling including a wheel for regulating linear and rotary motions, and further including at least one segment containing at least one row of sprockets coaxially aligned with said wheel;
a coilable rack having perforations and convex surface means for flattening about said wheel, the flattening of said convex surface means causing said perforations to respectively interlock with said sprockets thereby permitting said linear and rotary motions to be directed and received in equal amounts;
a signal generator containing a rotatable shaft coaxially fastened with said sprocket wheel coupling, and said signal generator including means for emitting electrical signals in response to rotational angles of said rotatable shaft; and
a housing, said signal generator and said rotatable shaft being mounted to said housing.

13. The device of claim 12, further comprising an adjustable rack guide assembly mounted to said housing with an adjustable bracket having a major axis directed toward a major axis of said rotatable shaft, and the rack guide assembly and said housing including adjustable means for sandwiching the rack against said wheel.

14. The device of claim 12, further comprising a rack holder assembly having a rotatable central shaft mounted to said housing, said rack holder assembly for receiving a proximal end of the rack and for storing a portion of the rack in the form of a coil, and further including a cursor assembly disposed at a distal end of the rack.

15. The device of claim 14, wherein said rack holder assembly further comprises means for adjusting and locking the central shaft a negator spring coiled around the central shaft and coupling the central shaft with the proximal rack end, and rotatable disks mounted on the central shaft, said portion of the rack being coiled around the disks.

16. The device of claim 14, wherein said cursor assembly includes a measurement indicating member disposed perpendicular to the rack.

17. The device of claim 16, wherein said measurement indicating member is mounted for axial movement along a major axis and has a tapered tip, and wherein the indicating member may be depressed so that the tip contacts a workpiece or a work surface, or so that the taper of said tapered tip contacts the edge of a hole in a workpiece and aligns the indicator major axis with a centerline of said hole.

18. The device of claim 16, wherein said measurement indicating member is a pencil, pen, or means capable of marking on a surface.

19. The device of claim 16, wherein said measurement indicating member includes a tip having a circumferential surface for contacting inner or outer sides of a workpiece.

20. The device of claim 16, wherein said measurement indicating member includes a tip embracing a 90degree cutout, and further includes a handle capable of rotating the member and allowing said 90degree cutout to respectively contact opposite corners of a workpiece.

21. The device of claim 16, further comprising a measuring beam having distances measured and certified with national measurement standards, and including means for synchronizing said distance with said signal generator electrical signals and relative rack longitudinal positions so that linear measurements then produced are by ratio relative with national measurement and equivalent international measurement standards.

22. The device of claim 16, further comprising a base, and means for rotatably mounting said housing to said base about a vertical axis, the means for rotatably mounting said housing including a rotatable vertical shaft coaxial with said vertical axis, the vertical shaft being fastened to and rotating with said housing.

23. The device of claim 21, wherein said means for synchronizing said distances includes computer means for converting said signal generator electrical signals into linear measurement signals and displaying linear measurements of the rack.

24. The device of claim 22, wherein said housing and said base further comprise means for limiting rotation of said housing with respect to said base.

25. The device of claim 22, further comprising an electrical switch mounted to said cursor assembly, and circuit means for electrically connecting the switch with an electrical connector mounted to said base.

26. The device of claim 22, further comprising a measuring beam having distances measured and certified by national measurement standards, and including means for synchronizing said distances with said signal generator electrical signals and relative rack longitudinal positions so that linear measurements then produced are by ratio relative with national measurement and equivalent international measurement standards.

27. The device of claim 22, further comprising a second signal generator mounted to said base, and wherein said rotatable vertical shaft is a rotatable shaft of said second signal generator, and said second signal generator having means for generating electrical signals in response to rotational angles of said vertical shaft thereby converting lateral rotations of said rack into electrical signals generated by said second signal generator.

28. The device of claim 25, wherein said circuit means is disposed along the rack and through said rack holder assembly.

29. The device of claim 27, further comprising a cursor holder mounted to said base, and said cursor holder having means for locking said cursor assembly in a position relative to said vertical axis, and where the shaft position of each signal generator is therefore relative with the rack position when said cursor assembly is locked with said cursor holder.

30. The device of claim 29, further comprising a spherical protective cover containing a slot allowing said rack to penetrate therethrough and rotate laterally.

31. The device of claim 29, wherein said means for synchronizing said distances includes computer means for converting said signal generator signals into radius vertex signals and said second signal generator signals into polar angle signals, and for calculating polar coordinate signals from the radius vertex and polar angle signals, and for displaying polar coordinate measurements of the rack.

32. The device of claim 31, wherein said computer means further comprises means for converting said polar coordinate signals into Cartesian coordinate signals and displaying Cartesian coordinate measurements of the rack.

33. A process for producing a product for bidirectionally interconverting linear and rotary motions, said process comprising the steps of:
    producing a coupling by fabricating a wheel having a diameter for regulating linear and rotary motions, and fabricating at least one segment means containing at least one row of sprockets having bases forming a diameter and having tangencies forming a diameter, and fabricating the diameters formed by said bases and said tangencies respectively smaller and larger than said diameter of said wheel;
    producing a coilable rack from a tape having a cross-sectional curvature therefore having a convex surface, and bending said tape about a diameter consistent with said diameter of said wheel while fabricating in said tape at least one row of perforations spaced to equal pitches of said sprockets, sized smaller than said sprockets, and longitudinally disposed along at least one side of said tape;
    providing rotatable axial means, arranging said coupling on said rotatable axial means, and providing means supporting said rotatable axial means;
    bending said tape toward said convex surface and about said coupling while arranging a number of said sprockets to partially penetrate a number of said perforations, and wearing and mating said perforations with said sprockets by alternately retracting opposite ends of said tape and causing said tape to flattten against said wheel; and
    fastening said coupling to said rotatable axial means so that rotations of said coupling cause mated perforations to fall upon, interlock and rotate with, and release and rise from mated sprockets thereby permitting linear motions of said coilable rack and rotary motions of said coupling to be directed and received in equal amounts.

34. A drive system for bidirectionally interconverting linear and rotary motions; said drive system comprising:
    a coilable, cross-sectionally curved rack having a convex surface and perforations along at least one of its sides, the rack being bent toward said convex surface; and a rotatably mounted coupling including sprockets coaxially aligned with a wheel supporting the bent convex surface, rotations of the coupling causing said sides to fall, rotate in the bend, and rise while said perforations are caused to flatten and engage with, rotate with, and disengage and rise from said axially aligned sprockets, the flattening of said perforations causing the engagements to fit tightly thereby permitting linear motions of the rack and rotary motions of the coupling to change mutually.

35. A drive system for bidirectionally interconverting linear and rotary motions; said drive system comprising:
    a coilable rack containing perforations along at least one of its sides and having a cross section containing a curved portion having a convex surface and being bent toward said convex surface; and
    a rotatably mounted sprocketed coupling having a wheel about which said convex surface is bent and flattened where rotations of the coupling cause said perforations to engage sprockets of said rotatably mounted sprocketed coupling, the flattening of said convex surface causing the engagements to interlock thereby permitting linear motions of said coilable rack and rotary motions of said sprocketed coupling to change equally.

36. A drive system process for bidirectionally interconverting linear and rotary motions; said drive system process comprising the steps of:
    passing a coilable rack containing perforations along at least one of its sides and having a cross section containing a curved portion having a convex surface against a rotatably mounted sprocketed coupling having a wheel engaging said convex surface and causing said convex surface to rotate about said wheel and cause said perforations to engage sprockets of said rotatably mounted sprocketed coupling, the flattening of said convex surface causing the engagements to interlock thereby permitting linear motions of said coilable rack and rotary motions of said rotatably mounted sprocketed coupling to be displaced equally.

* * * * *